July 31, 1934.  H. C. MOFFETT  1,968,801

POSITIVE DRIVE DIFFERENTIAL

Filed Feb. 14, 1934

INVENTOR.
Henry C. Moffett

Patented July 31, 1934

1,968,801

UNITED STATES PATENT OFFICE 1,968,801

POSITIVE DRIVE DIFFERENTIAL

Henry C. Moffett, Oakland, Calif., assignor of one-third to Paul F. Raef, Oakland, Calif.

Application February 14, 1934, Serial No. 711,200

13 Claims. (Cl. 74—315)

This invention is a positive drive differential, differing from the usual differential in the fact, that although the differential action can take place when the torque applied to the wheels or shafts remains substantially constant, yet no differential action can take place if either wheel has any tendency to slip, therefore, uniform speed is transmitted to both wheels at all times irrespective of road or brake conditions, while urgence delivered by either wheel compensated for by restraint of the other wheel permits differential actuation to take place.

As is well known, with the usual differential, if one wheel brake fails, or if one wheel has reduced traction, that wheel speeds up while the other wheel remains stationary or substantially so. For this reason, mud, snow, ice and sand are difficult to negotiate with the usual differential.

With this invention, irrespective of the variation in traction or wheel friction or shaft resistance, the speed of the wheels or shafts remains constant or identical, and excess power is transferred to the wheel having maximum traction, provided the traction on the other wheel is insufficient to prevent slipping, and one wheel cannot be driven at a speed greater than the other. However, when external power and restraint is mutually coactive between the wheels and not attributable to the driving means or prime mover, such as in rounding a turn where one wheel must lag while the other must accelerate, differential action is unrestrictedly obtained.

The main object of the invention is to provide a positive drive differential, which, when driven by a prime mover will drive both ends of the differential at the same speed, and in which differential action is only obtainable by mutual cooperation between the axles.

Another object of the invention is to provide a differential which is inoperative as a differential through power applied from a prime mover, and operative only when the power is externally applied, such as through the wheels driving the axles, whereby, loss of friction or road traction on one wheel will not permit the power from the prime mover to speed up the wheel having low value traction.

A further object of the invention is to provide a differential as outlined which permits any required differential action between the axles when the axles are mutually responsive, such as making a turn in an automotive vehicle, in which case the power for differential action is derived from the wheels.

Figure 1:
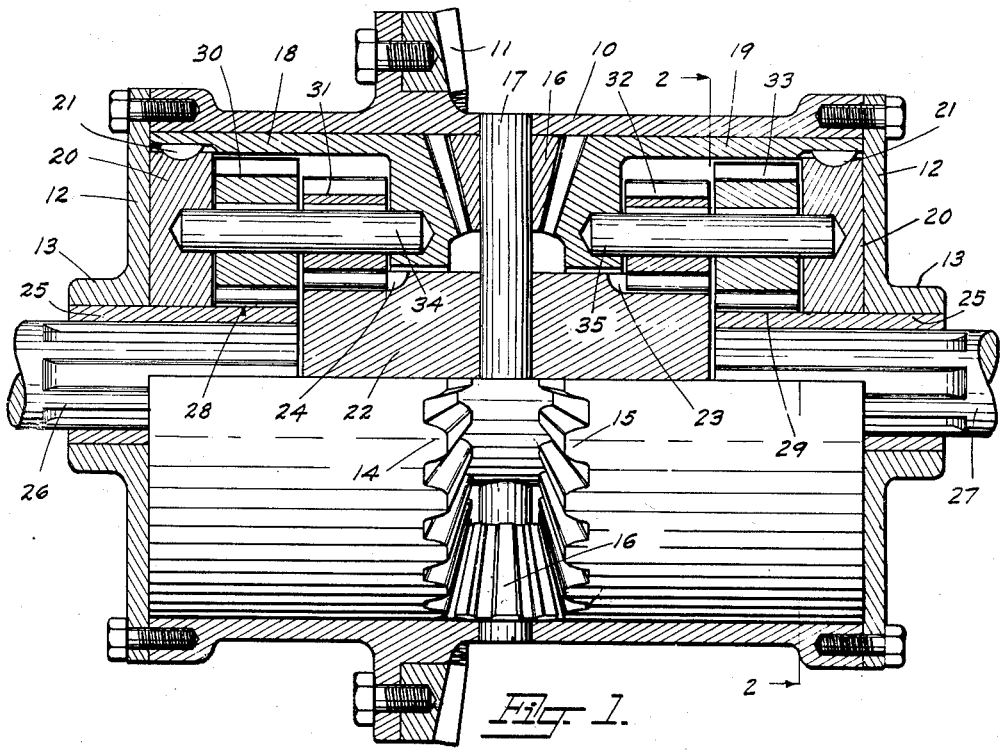

Other objects and advantages of the invention will become apparent as the following description is read on the drawing forming a part of this specification, and in which similar reference characters are used to designate similar parts throughout the several views, of which, Fig. 1 is a sectional elevation through the differential drum showing the spiders in half section.

Figure 2:
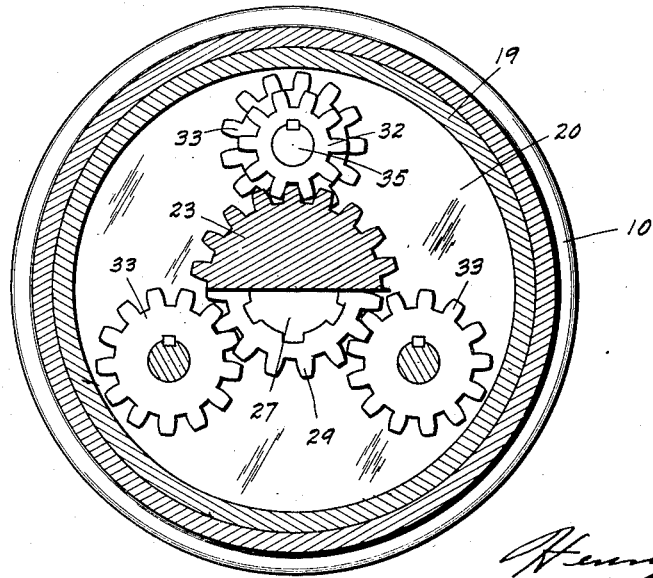

Fig. 2 is a section taken on line 2—2 of Fig. 1.

The invention consists of a drum 10, which is rotatably mounted in the usual axle housing (not shown), the drum 10 having a master gear fixedly mounted thereon as indicated at 11, and which drum is driven by a prime mover, (not shown). A removable head 12 is provided for each end of the drum, and a bearing hub 13 is formed on each head 12, the bearing hubs rotatably receiving the axle sun-pinion hubs. The drum is shown as cylindrical in form, although this form may be modified as desired.

The differential proper consists of the usual differential gears 14 and 15, differential pinions 16, and transverse pinion shafts or studs 17.

The control spiders 18 and 19 are rotatably mounted in the drum 10, the differential gears 14 and 15 being formed in the adjacent faces of the spiders, or secured thereto. Each spider is provided with a removable head or end plate 20, which is made non-rotatable in the spider bore as indicated at 21 and is retained in the spider by friction, pinning or other suitable means.

The control hub 22 is fixedly mounted in axial position centrally of the drum and is secured in position and supported by the shafts or studs 17. If desired, the bore of the spiders may be made to bear on the hub to retain the hub in position and axial alignment. Gear teeth are formed in each end of the control hub 22 forming the gears or sun pinions 23 and 24.

Rotatably mounted in the hubs 13 and spider end plates 20 are internally splined sleeves 25, in which the axles or shafts 26 and 27 are slidably and non-rotatably fitted. A gear, or sun pinion, is formed on each sleeve as indicated at 28 and 29.

The control pinions or gears 30—31 and 32—33 are fixed together in pairs, either by keying to their supporting shafts 34 and 35 or are made in one integral unit of two gears of different diameters, the smaller of which meshes with the hub sun pinion, and are freely rotatable in and with the spider, the larger of these gears meshing with the sleeve or axle sun pinion. The gears 30—31 and 32—33 are mounted as planetary gears, and are free to rotate about their orbit.

The pinions 30—31 and 32—33 function in several different ways, in one of which they merely function as keying elements between the shafts and the drum; in another of which they function as planetary gears, and in the third as direct drive gearing.

The differential gears only maintain the relative positions of the spiders and compensate for mutual variation between the axles 26 and 27.

Under ordinary driving conditions, on the straight-away, the drum 10, axles 26 and 27, and spiders 18 and 19 all rotate in unison, and the pinions 30—31 and 32—33 merely lock or key the axles 26 and 27 to the drum 10 through the control hub 22, and this condition exists at all times so far as the power from the prime mover is concerned, except, in the event that one wheel has a tendency to run free or slip; the planetary action of these gears immediately comes into play to counteract the tendency of the free wheel to accelerate.

In rounding a turn, for instance, to the right as viewed in the drawing with the vehicle moving in a direction toward the top of the drawing, combined keying action, modified by planetary action and direct drive of the gears is accomplished, axle 26 speeding up and driving gears 30 and 31, the step-down ratio to pinion 24 causing a lagging action of the spider 18, which through the gear 14, pinion 16 and gear 15 accelerates the spider 19, which through a combination of planetary, keying and direct action of the gears 32—33 of increasing ratio causes a lag in the axle 27 proportionate the acceleration of axle 26. It will be noted that the spider must lag behind the drum to accelerate the axle ahead of the drum.

As will be noted, with the drum positively held, and axle 26 rotated on one direction, the other axle will rotate at the same speed in the opposite direction, since the ratio is increasing on one side and decreasing on the other side, thereby being self-compensating, when the power is derived from the wheel.

This condition changes completely when the drum is driven by the prime mover, since any effort of the prime mover to increase the speed of the shaft in view of reduced resistance of that shaft, such as by slipping of a wheel, is immediately counteracted by the effort of the gear train 28, 30, 31, 24, to reduce the speed of the spider below that of the drum, and the shaft cannot be driven at a higher speed by the prime mover without driving the spider at a higher speed. Therefore, the action is nullified.

This is readily proven by the fact, that the planetary action from the drum to the axle is speed reducing to the spider where slip is concerned.

As further proof, mathematical calculation will clearly indicate that if all resistance is removed from one axle or wheel, that the speed cannot increase, since, considering;

N=Revolutions per minute of shaft 27.
M=Revolutions per minute of shaft 26.
L=Revolutions per minute of spider 18 or 19.
J=Revolutions per minute of drum 10.
A=Number of teeth in pinions or gears 31 and 32.
B=Number of teeth in pinions 24 and 23.
C=Number of teeth in gears 30 and 33.
D=Number of teeth in pinions 28 and 29.

Then considering L=105, J=100, A=10, B=20, C=12, and D=18, then;

$$M = J - \frac{D}{c\left\{\left[(L-J)\left(\frac{B}{A}+1\right)\right] - \left[(L-J)\left(\frac{D}{C}+1\right)\right]\right\}}$$

and;

$$M = 100 - \frac{18}{12[(5 \times 3) - (5 \times 2.5)]} = 99.4 \text{ R. P. M.}$$

To increase the speed of shaft 26 relative to shaft 27, differential action must take place and spider 18 must accelerate while spider 19 must decelerate, and since any effort to accelerate the speed of spider 18 ahead of the speed of the drum is counteracted by the gears to decrease the speed of the spider, the driving from the prime mover can be none other than positive.

However, immediately there is compensating acceleration and deceleration produced by external power delivered by the wheels through both axles through uniform traction, the differential action is immediately responsive.

Should a brake be applied to one wheel or axle and not to the other, the braking action would be immediately imparted to both wheels, since differential action can not occur where actual slip of one wheel is concerned, such differential action requiring a positive urge to function, and such differential urge is provided only, when the urge of the axles themselves are mutually compensating.

In any case where the prime mover power tends to cause slip of one wheel, substantially all of the power is transferred to the wheel having proper traction.

It will be understood that variations in construction and arrangement of parts which are consistent with the appended claims may be resorted to without detracting from the spirit or scope of the invention or sacrificing any of the advantages thereof.

I claim:

1. In combination, a driven drum, coaxial axles and a pinion mounted on each axle, a control hub centrally fixed in the drum and a pinion at each end of the hub, a spider rotatable in each end of the drum, a pair of planet gears fixed together and rotatably mounted in each spider and meshing with the axle pinion and hub pinion, and compensating means cooperating between the spiders and having certain of its elements affixed to the spiders.

2. In combination, a driven drum, coaxial axles, and a small pinion mounted on each axle, a control hub centrally fixed in the drum and a large pinion at each end of the hub, a spider rotatable in each end of the drum, a pair of planet gears fixed together and rotatably mounted in each spider and meshing with the axle pinion and hub pinion, a differential gear integral with each spider and a differential pinion between and cooperating with the differential gears.

3. In combination with driving means and differential gears and two coaxial axles rotatable relative to said driving means and to said differential gears, means between and cooperating with each axle and the differential for driving both axles at uniform speed under uniform axle resistance conditions, and for maintaining the speed of both axles and increasing the torque on the axle having high resistance to turning and decreasing the torque on the axle having low resistance to turning, when non-uniform torque between the axles is created, such as by slip of a wheel, said means comprising a spider for each axle and having one of said differential gears integral therewith, a sun pinion associated with each axle, two planetary gears fixed together and rotatably mounted in each spider, and a second sun pinion for each axle and fixed relative to the driving means.

4. In combination with differential gears and a housing therefor and coaxial shafts; positive driving means between and cooperating with each shaft and the differential gearing delivering uniform speed to both shafts from a source of power, irrespective of inequality of shaft resistance, and providing differential action between the shafts by mutual compensating urge between the shafts, and comprising a spider for each shaft and having a differential gear integral therewith, a sun pinion fixed to each shaft, two planetary gears fixed together and rotatably mounted in each spider, and a second sun pinion for each shaft and fixed to a central hub in the housing.

5. In combination, driving means, a driven drum, differential gears within the drum and cooperating differential pinions, coaxial axles, and means cooperating with each shaft and with the drum and differential gearing maintaining uniform speed between the shafts irrespective of the variation in resistance existing between the shafts as related to the driving means, and permitting differential action through urgence not associated with the driving means, said means comprising a spider for each shaft and having a differential gear affixed thereto, a sun pinion fixed on each shaft, two planetary gears fixed together and rotatably mounted in each spider, and a second sun pinion for each shaft and fixed relative to the drum.

6. A positive drive differential comprising a drum and means for driving the drum, a central control hub fixed relative to the drum and a gear formed at each end of the hub, differential gears and pinions within the drum, coaxial shafts and a pinion on each shaft, a spider for each shaft and rotatable within the drum and having said differential gears affixed thereto, a pair of planet gears in each spider cooperating respectively with the shaft pinion and the hub pinion, said planet gears normally forming keying means between the shafts and the control hub and operating as planetary gears and direct gear trains under variations in urgence created by the shafts to permit differential action in association with the differential gearing.

7. In combination with driving means and coaxial shafts rotatable independently of the driving means, two sun pinions fixed for rotation with the driving means, a sun pinion fixed on each shaft, two pairs of planet gears rotatable in an orbit and meshing with the pinions and supporting means therefor, and restraining means having certain of its elements affixed to the supporting means.

8. In combination with driving means and coaxial shafts rotatable independently of the driving means, sun pinions integral with the driving means, a sun pinion fixed on each shaft, planet gears fixed together and rotatable in an orbit and meshing with the pinions, and supporting means therefor, the shaft pinions being of smaller diameter than the other pinions, and differential gears fixed to the supporting means, and differential pinions between and cooperating with the differential gears.

9. In combination, driving means, a driven drum, coaxial shafts and a pinion mounted on each shaft, a control hub centrally fixed in the drum and a pinion formed at each end of the hub, a spider rotatable in each end of the drum, a pair of planet gears fixed together and rotatably mounted in each spider and being of different diameters, the larger gear meshing with the shaft pinion, and the smaller gear meshing with the hub pinion, and a differential comprising gears and planet pinions having its gears affixed to the respective spiders.

10. In combination, driving means, a driven drum, coaxial shafts and a pinion mounted on each shaft, a control hub centrally fixed in the drum and a pinion formed at each end of the hub, a spider rotatable in each end of the drum, a pair of planet gears fixed together and rotatably mounted in each spider and being of different diameters, the larger gear meshing with the shaft pinion and the smaller gear meshing with the hub pinion, and a differential comprising gears and planet pinions with its differential gears fixedly mounted on the spiders.

11. A positive drive differential comprising a drum and driving means therefor, coaxial, axles rotatable relative to the drum, two spiders within the drum and rotatable relative to the drum and to the axles and each having a differential gear integral therewith, a pair of planetary gears fixed together and rotatably mounted in each spider, an axial hub centrally fixed in the drum and having a sun pinion at each end, a smaller sun pinion fixed on each axle, said planet gears meshing with said sun pinions and being of different diameters.

12. In combination with a differential having gears, coaxial axles independently rotatable relative to the gears, and a housing having a central hub fixed therein; a shaft mounted on each gear, a pair of planet gears fixed together and rotatable with each shaft, a sun pinion fixed on each axle and another sun pinion formed in each end of the hub, said pinions meshing with said planet gears and being of different diameters.

13. In combination with a differential having gears and a housing therefor having a central fixed hub, coaxial axles rotatable relative to the gears and to the housing, a spider integral with each gear and a shaft in each spider, a pair of planet gears fixed together and rotatable with each shaft, a sun pinion formed at each end of the hub, and a smaller sun pinion fixed on each axle, whereby low ratio reverse action is transmitted to an axle when reaction torque on the axle is decreased.

HENRY C. MOFFETT.